United States Patent
Sadowara et al.

(10) Patent No.: US 10,523,848 B2
(45) Date of Patent: Dec. 31, 2019

(54) IMAGE PROCESSING APPARATUS FOR PROCESSING MARKED REGIONS

(71) Applicant: TOSHIBA TEC KABUSHIKI KAISHA, Shinagawa-ku, Tokyo (JP)

(72) Inventors: Tetsuya Sadowara, Mishima Shizuoka (JP); Hiromasa Tanaka, Shimizu Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/000,363

(22) Filed: Jun. 5, 2018

(65) Prior Publication Data

US 2019/0166284 A1 May 30, 2019

(30) Foreign Application Priority Data

Nov. 27, 2017 (JP) .................... 2017-226572

(51) Int. Cl.
| | |
|---|---|
| H04N 1/60 | (2006.01) |
| G06K 9/62 | (2006.01) |
| G06K 9/00 | (2006.01) |
| G06K 9/20 | (2006.01) |

(52) U.S. Cl.
CPC ....... *H04N 1/6094* (2013.01); *G06K 9/00456* (2013.01); *G06K 9/00463* (2013.01); *G06K 9/2063* (2013.01); *G06K 9/2081* (2013.01); *G06K 9/6268* (2013.01)

(58) Field of Classification Search
None
See application file for complete search history.

(56) References Cited

U.S. PATENT DOCUMENTS

| | | | | |
|---|---|---|---|---|
| 5,619,592 A | * | 4/1997 | Bloomberg | G06K 9/20 382/175 |
| 8,494,280 B2 | | 7/2013 | Nagarajan et al. | |
| 2007/0253620 A1 | * | 11/2007 | Nagarajan | G06K 9/2054 382/164 |

FOREIGN PATENT DOCUMENTS

JP 2013-161143 8/2013

OTHER PUBLICATIONS

Ricardo Da Silva Barboza et al: "Using Readers Highlighting on Monochromatic Documents for Automatic Text Transcription and Summarization", 2011 International Conference on Document Analysis and Recognition, Sep. 30, 2011 (Sep. 30, 2011), pp. 212-216, XP055574178, DOI: 10.1109/ICDAR.2011.51, ISBN: 978-1-4577-1350-7.

Search Report dated Apr. 4, 2019, received in corresponding European application No. 18 20 8528.2, 8 pages.

* cited by examiner

*Primary Examiner* — Andrew H Lam
(74) *Attorney, Agent, or Firm* — Foley & Lardner LLP

(57) ABSTRACT

According to one embodiment, an image processing apparatus includes a scanner, a memory, and a processor. The scanner acquires a read image of an original document. The memory stores the read image of the original document that is acquired by the scanner. The processor detects a highlighted region including a region that is highlighted with a chromatic color in the read image of the original document which is stored in the memory and a circled region including a region circled by the chromatic color, and classifies the highlighted region as a region for first processing and classifies the circled region as a region for second processing.

15 Claims, 6 Drawing Sheets

IMAGE PROCESSING APPARATUS FOR PROCESSING MARKED REGIONS

CROSS-REFERENCE TO RELATED APPLICATION

This application claims the benefit of and priority to Japanese Patent Application No. 2017-226572, filed Nov. 27, 2017, the entire contents of which are incorporated herein by reference.

FIELD

An embodiment described herein relates generally to an image processing apparatus.

BACKGROUND

A certain image processing apparatus such as a digital multifunction printer has a function of detecting a region (marker region) marked by a marker pen on an original document and performing processing such as OCR processing in the detected region. A certain digital multifunction printer of the related art has a function of classifying a plurality of marker regions into a plurality of categories by designating coordinates on an original document of a predetermined format such as a slip of a fixed form. However, in order to classify a plurality of marker regions on the original document of which format is not determined into a plurality of categories, it is necessary to designate coordinates defining a category for each original document.

In addition, there is a technique for classifying a marker region as a user writes a symbol character in a marker region and an image processing apparatus recognizes the symbol character in the marker region. However, the technique of the related art requires labor for the user to write the symbol character to each marker region. In addition, there is a problem that the image processing apparatus may erroneously recognize the symbol character written in the marker region.

DETAILED DESCRIPTION

An object to be achieved by an example embodiment is to provide an image processing apparatus capable of easily classifying a plurality of marked regions on an original document.

In general, according to one embodiment, an image processing apparatus includes a scanner, a memory, and a processor. The scanner acquires a read image of an original document. The memory stores the read image of the original document that is acquired by the scanner. The processor detects a highlighted region including a region that is highlighted with a chromatic color in the read image of the original document which is stored in the memory and a circled region including a region circled by the chromatic color, and classifies the highlighted region as a region for first processing and classifies the circled region as a region for second processing.

Hereinafter, embodiments will be described with reference to the drawings.

An image processing apparatus according to an embodiment includes an image reading apparatus that reads an original document and a processing unit that processes an image read by the image reading apparatus. For example, the image processing apparatus according to the present embodiment is realized by a digital multifunction printer or the like including a scanner or the like as an image reading apparatus. In addition, the image processing apparatus according to the present embodiment may be configured as a system including the scanner as the image reading apparatus and a computer connected to the scanner.

Figure 1:
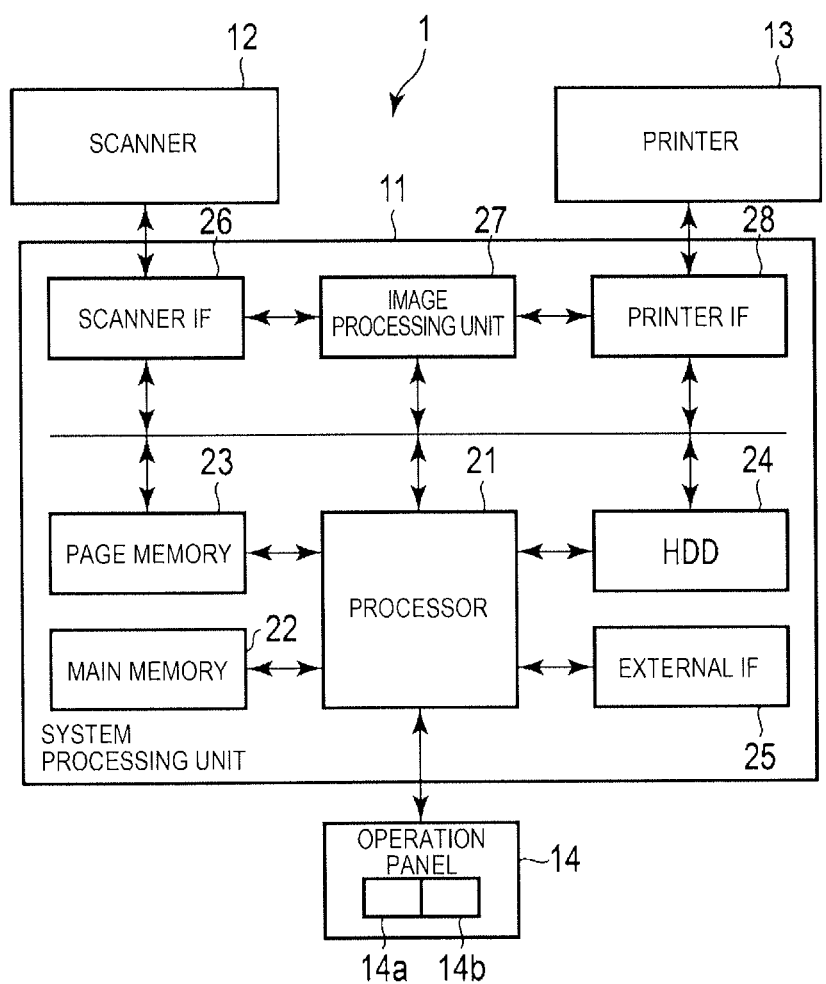
FIG. 1 is a block diagram illustrating a configuration example of an image processing apparatus according to an embodiment.

FIG. 1 is a block diagram illustrating a configuration example of an image processing apparatus 1 according to an embodiment.

As illustrated in FIG. 1, the image processing apparatus 1 includes a system processing unit 11, a scanner 12, a printer 13, and an operation panel 14. For example, the image processing apparatus 1 illustrated in FIG. 1 illustrates a configuration example assuming a digital multifunction printer.

The scanner 12 scans an original document disposed on an original document table (for example, a transparent glass plate) to acquire an image of the original document. For example, the scanner 12 includes a light emitter and a photoelectric conversion device. The light emitter emits light toward a surface of the original document disposed on the original document table. The photoelectric conversion device includes a light receiving element (such as a CCD image sensor) and the like that receive light from the surface of the original document and converts the light into electronic data. In addition, the scanner 12 may read an image of an original document fed by an automatic document feeder (ADF).

For example, the scanner 12 scans the image of the surface of the original document set on the original document table in response to an instruction from the system processing unit 11. The scanner 12 generates image signals (RGB image data) representing each pixel as R (red), G (green), and B (blue) values, according to the scanned image. The scanner 12 outputs the generated RGB image data to the system processing unit 11 as a read image of an original document.

The printer 13 is an image forming device that forms an image on a sheet as a recording medium. The printer 13 forms an image on the sheet, based on the image data for printing supplied from the system processing unit 11. In the printer 13, an image forming method is not limited to a specific method. For example, the printer 13 may be an image forming device of an electrophotographic type or may be an image forming device of an ink jet type or a thermal transfer type.

The operation panel 14 includes the display portion 14a and the operation portion 14b. For example, the operation panel 14 includes a touch panel including an operation portion 14b provided with a display portion 14a (e.g., a touch sensitive display for receiving user instructions). In addition, hard keys such as a start key and numeric keys may be provided at the operation portion 14b. The display portion 14a displays a state of the image processing apparatus 1, a progress situation of job, and the like.

The system processing unit 11 controls each hardware of the image processing apparatus 1. The system processing unit 11 includes a processor 21, a main memory 22, a page memory 23, a hard disk drive (HDD) 24, an external interface (IF) 25, a scanner IF 26, an image processing unit 27, a printer IF 28, and the like. The processor 21 is, for example, a central processing unit (CPU), a micro processing unit (MPU), or the like. The main memory 22 includes various memories such as a RAM and a ROM.

The page memory 23 temporarily stores the image data to be processed. For example, the page memory 23 stores the image data processed by the image processing unit 27. The processor 21 performs various types of processing which will be described below for the image data stored in the page memory 23.

The HDD 24 is a rewritable nonvolatile memory. The HDD 24 stores data and a program. The processor 21 realizes various types of processing by executing a program stored in the ROM of the main memory 22 or the HDD 24. For example, the processor 21 functions as a control unit or a data processing unit by developing and executing the program in the RAM of the main memory 22.

The external IF 25 is an interface for communicating with an external device. For example, the processor 21 may output the image data obtained by processing which will be described below to the external device via the external IF 25.

The scanner IF 26 is an interface for connecting the scanner 12. The printer IF 28 is an interface for connecting the printer 13.

The image processing unit 27 performs imaging preset for the image data. For example, the image processing unit 27 is realized by an application specific integrated circuit (ASIC). The image processing unit 27 may include an inputting unit that processes an input image and an outputting unit that processes an image to be output. For example, the inputting unit of the image processing unit 27 performs predetermined imaging for image data read by the scanner 12 or image data supplied from an external device. In addition, the outputting unit performs imaging for converting the image data into image data for printing to be output to the printer 13.

For example, the image processing unit 27 performs predetermined imaging such as color conversion and filtering as inputting, for the RGB image data (read image of an original document) from the scanner 12. The image processing unit 27 stores the image data subjected to the inputting in a memory of the system processing unit 11. In addition, the image processing unit 27 may perform predetermined image compression for the image data subjected to the inputting and store the image data in the memory of the system processing unit 11 as an image file of a predetermined format.

Next, classifying of a marker region in the image processing apparatus 1 according to the embodiment will be described.

The image processing apparatus 1 has a function of detecting a plurality of types of marker regions marked in a read image of an original document by a chromatic color marker pen (hereinafter, simply referred to as a marker). In addition, the image processing apparatus 1 has a function of classifying the marker regions detected from the read image of an original document and a function of performing various types of processing for each region according to each classification. In the present embodiment, a series of processing including detection and classification of the marker regions for the read image of an original document is described as classifying of the marker regions.

In addition, in the present embodiment, it is assumed that the image processing apparatus 1 detects a highlighted region (first region) and a circled region (second region) as an example of the marker region. The highlighted region is detected based on a region highlighted on the original document by a marker. For example, the highlighted region is assumed to be a region marked as a user traces the character string with the marker so as to designate a specified character string in the original document. In addition, the circled region is detected based on a region encircled by a line represented by the marker on the original document. For example, the circled region is assumed to be a region designated as a user marks a region including a character group, a figure or the like that the user wants to designate on an original document so as to be encircled with the marker.

Furthermore, the image processing apparatus 1 according to the present embodiment has a function of classifying the detected various marker regions into a plurality of categories or the like. In a processing example which will be described below, the image processing apparatus 1 classifies the highlighted region as a region for first processing and classifies the circled region as a region for second processing. That is, the first processing is performed for the highlighted region, and the second processing is performed for the circled region. For example, in the first processing and the second processing, processing required as one step in a job or a workflow is performed by using either the highlighted region or the circled region. Each region may be subjected to OCR processing, and each text extracted by OCR may be taken into a processing process previously linked with a highlighted region or the circled region as processing required for a workflow. In addition, the first processing and the second processing may be OCR processing performed by different algorithms, or may be OCR processing of recognizing a character using different dictionaries. In addition, the first process and the second process may be processing other than the OCR processing.

Next, an original document to be processed by the image processing apparatus 1 according to the embodiment and a region (marker region) marked by a marker on the original document will be described.

In the present embodiment, it is assumed that a user marks various regions using a marker on an original document to be processed in processing (classifying of a marker region) which will be described below. For example, the user highlights a region (for example, a character string) where the first processing is performed on the original document, and marks the region (for example, a region including a plurality of characters and figures and the like) where the second processing is performed so as to be circled. The marker is a pen that marks a color detected as a chromatic color on an original document in processing which will be described below. The marker may be a dedicated pen for preparing in advance, or may be a pen that can detect a color as a chromatic color among pens being generally distributed.

Figure 2:
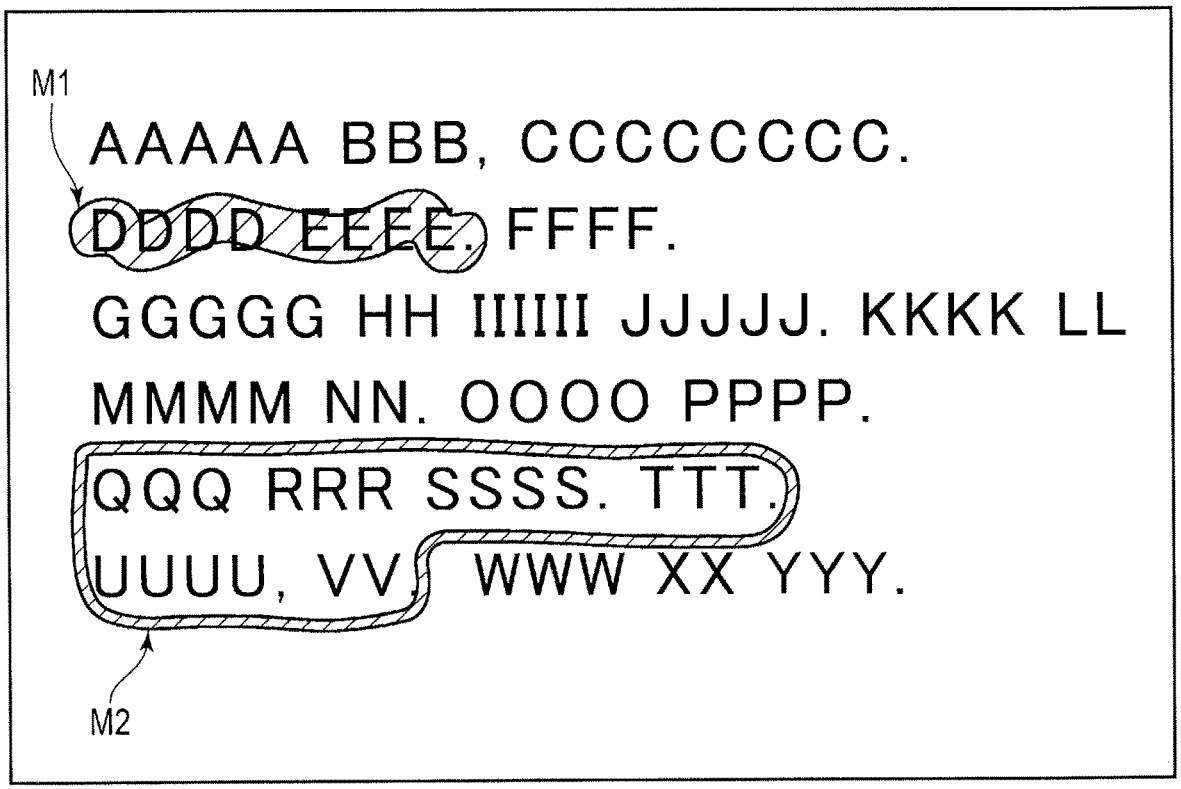
FIG. 2 is a diagram illustrating an example of an original document to be scanned by the image processing apparatus according to the embodiment.

FIG. 2 is a diagram illustrating an example of an original document in which a highlighted region and a circled region are designated by a marker.

The original document illustrated in FIG. 2 includes a first mark M1 and a second mark M2 (e.g., marked by a marker of a chromatic color). The mark M1 illustrates an example of a highlighted region marked on the original document. The mark M2 illustrates an example of a region marked by a circle on the original document. In the example illustrated in FIG. 2, the mark M1 is formed such that a character string configured by eight characters arranged in one line on the original document is highlighted. The mark M2 is formed such that a region including a character group configured by a plurality of characters in two rows is circled.

Often, a user performs marking by tracing a character, a character string or the like to be designated by using a marker as region designation marked by a different transparent color. Accordingly, it is assumed that all objects to be designated are often not completely highlighted. In the specific example illustrated in FIG. 2, the mark M1 highlights at least a part of the respective characters in a character string configured by eight characters, but does not highlight all the characters.

In addition, the user marks a region including a set of characters, figures, and the like to be designated so as to be circled as region designation made by a circle. Accordingly, it is assumed that the set of characters, figures, and the like to be designated are often completely included in a marked enclosure. In the specific example illustrated in FIG. 2, the mark M2 illustrates a region enclosed so as to completely include all characters of 19 characters arranged in two lines.

Next, an operation example of the image processing apparatus 1 according to the embodiment will be described.

Figure 3:
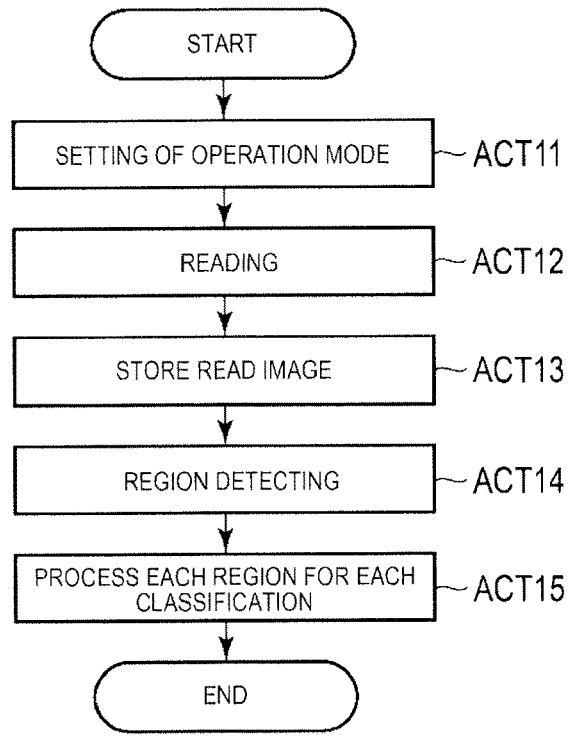
FIG. 3 is a flowchart illustrating an operation example of the image processing apparatus according to the embodiment.

FIG. 3 is a flowchart schematically illustrating a flow of the classifying of the marker region in the image processing apparatus 1.

First, a user instructs the classifying of the marker region on the original document by using the operation portion 14b of the operation panel 14. Furthermore, the user sets an original document on which each region to be classified is marked by a marker, on an original document table of the scanner 12, and instructs the operation panel 14 to starting.

The processor 21 of the image processing apparatus 1 detects that the classifying of the marker region is designated on the operation panel 14. If the classifying of the marker region is designated, the processor 21 sets an operation mode to a mode for performing the classifying of the marker region (ACT 11). If the classifying of the marker region is set, the processor 21 waits for an instruction to start scanning on the operation panel 14. If start of scanning is instructed, the processor 21 performs processing of reading an original document on the original document table using the scanner 12 (ACT 12).

The scanner 12 scans an image of a surface of an original document set on the original document table in response to an instruction from the processor 21, and generates RGB image data as a read image of the original document. The scanner 12 outputs the RGB image data as the read image of the original document to the image processing unit 27. The image processing unit 27 performs inputting such as color conversion and filtering for the RGB image data from the scanner 12 and stores the image data in a memory (ACT 13). For example, the image processing unit 27 stores the RGB image data as the read image of the original document subjected to the inputting in the page memory 23. In addition, the image processing unit 27 may perform data conversion such as compressing for the RGB image data subjected to the inputting and store the image data in the HDD 24 as an image file of a predetermined format.

After the image data as the read image of the original document is stored in the memory, the processor 21 performs region detecting of detecting a marker region for the read image of the original document (ACT 14). The processor 21 detects various marker regions in the read image of the original document and classifies the detected marker regions, as the region detecting.

For example, the processor 21 detects a mark appearing as a chromatic color region in the read image of the original document. The processor 21 determines a region (marking method) indicated by the detected mark. The processor 21 classifies the marker regions indicated by each mark, according to the determined marking method and cuts out an image of the classified marker region.

In the present embodiment, it is assumed that the processor 21 detects a highlighted region and a circled region as a plurality of types of marker regions in the read image of the original document. The processor 21 detects the highlighted region and the circled region in the read image of the original document and cuts out an image of the highlighted region and an image of the circled region. In the present embodiment, the processor 21 classifies the highlighted region as a region for first processing and classifies the circled region as a region for second processing.

Region detecting of ACT 14 will be described below in detail.

If the respective marker regions in the read image of the original document are classified, the processor 21 executes processing set for each classification for the classified marker regions (ACT 15). In the present embodiment, it is assumed that the processor 21 performs the first processing for the image of the highlighted region and performs the second processing for the image of the circled region.

According to the classifying of the marker region described above, the image processing apparatus classifies a plurality of marker regions on the original document, according to a marking state for each region. In the present embodiment, the image processing apparatus discriminates between the highlighted region that a user designates so as to be highlighted with a marker and the circled region that the user designates so as to be circled with the marker. Thereby, the user can classify and process each region marked so as to be highlighted or circled, using one marker without using a plurality of markers.

Next, region detecting of detecting a marker region on the original document will be described.

Figure 4:
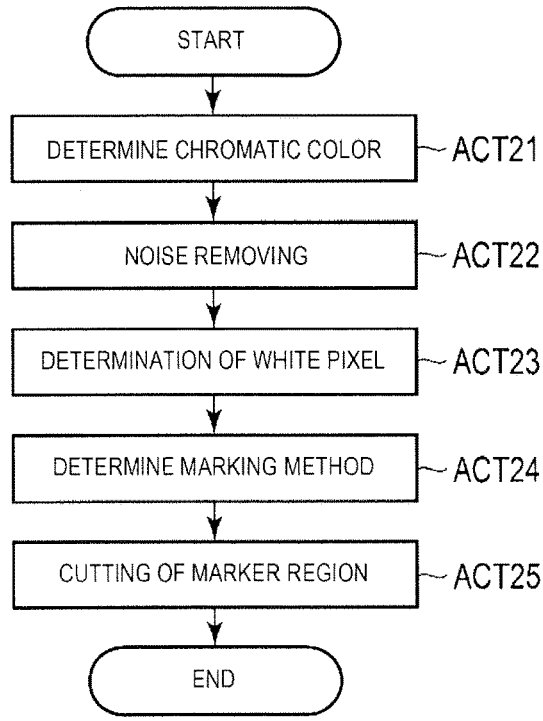
FIG. 4 is a flowchart illustrating an operation example of region detecting of an image reading apparatus according to the embodiment.

FIG. 4 is a flowchart illustrating the region detecting performed by the image processing apparatus 1 according to the embodiment.

The processor 21 of the system processing unit 11 performs region detecting of detecting a marker region for a read image of an original document. For example, if the read image of the original document is made into a file and stored in the HDD 24, the processor 21 restores the file to RGB image data and develops the image data in the page memory 23. Here, it is assumed that the original document on which each region is marked by a chromatic color marker on a monochrome (black and white) document is provided. In addition, it is assumed that the read image of the original document to be processed by the processor 21 is RGB image data.

In the region detecting, the processor 21 determines a chromatic color pixel as color marked by a marker in the read image (RGB image data) of the original document (ACT 21). For example, the processor 21 determines whether or not a value of |R−G| or |G−B| for each pixel is greater than or equal to a threshold value, thereby determining the chromatic color of the read image of the original document. In addition, the processor 21 may convert a space into a space of L*a*b* and control such that a case of being included in a region of a preset achromatic color region is determined to be an achromatic color.

If the chromatic color pixel in the read image of the original document is determined, the processor 21 performs noise removal by removing noise in the read image of the original document (ACT 22). The noise removal is processing of removing (noise removing) noise components due to variation in reading by the scanner 12, dust adhered to an original document table, an optical system, or the like, and the like. In addition, it is assumed that the noise removing also includes processing (mark correction) of correcting blur of a mark, disconnection, and the like so as to detect a marked part intended by a user (person who marks).

For example, the processor 21 removes the noise components due to variation in reading, dust or the like for a pixel determined to have a chromatic color and pixels around the pixel, as noise removal. As a specific example, the processor 21 can remove a small chromatic color pixel (noise components) by compressing and expanding the read image of the original document.

In addition, the processor 21 corrects a portion where the mark is blurred, or a disconnected portion to a chromatic color as mark correction. That is, the mark correction is processing of converting an achromatic color mixed in a portion (region) where a chromatic color pixel group to be originally combined is disconnected, or a region of a chromatic color pixel group into a chromatic color. As a specific example, the processor 21 can realize mark correction for converting the blur and the disconnection into a chromatic color by compressing and expanding the read image of the original document.

Figure 5:
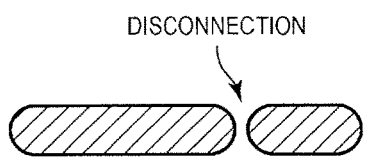
FIG. 5 is a diagram illustrating an example of noise included in a read image of an original document to be processed by the image processing apparatus according to the embodiment.

FIG. 5 illustrates an example of an image in which the marked region (pixel group determined to be a chromatic color) is disconnected within a small range. In addition, FIG. 6 is a diagram illustrating an example of an image subjected to mark correction for the image illustrated in FIG. 5.

Figure 6:
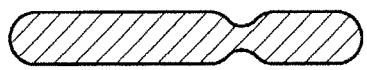
FIG. 6 is a diagram illustrating an example of an image in which noise is removed by the image processing apparatus according to the embodiment through noise removing.

The image illustrated in FIG. 5 is corrected to an image illustrated in FIG. 6 by performing expansion and compressing as mark correcting included in the noise removing. That is, the portion where the mark is disconnected is connected by the noise removing and the image illustrated in FIG. 5 is converted into the image illustrated in FIG. 6.

Figure 7:
FIG. 7 is a diagram illustrating an example of noise included in a read image of an original document to be processed by the image processing apparatus according to the embodiment.
Figure 8:
FIG. 8 is a diagram illustrating an example of an image in which noise is removed by the image processing apparatus according to the embodiment through the noise removing.

FIG. 7 illustrates an example of an image in which achromatic pixels coexist in a marked region (pixel group determined to be a chromatic color). In addition, FIG. 8 is a diagram illustrating an example of an image obtained by performing mark correction for the image illustrated in FIG. 7.

For example, the image as illustrated in FIG. 7 appears due to blur occurring when a user marks an original document with a marker. The image illustrated in FIG. 7 is corrected to an image illustrated in FIG. 8 by performing expansion and compressing as the mark correcting included in the noise removing. That is, the image illustrated in FIG. 7 is converted into the image illustrated in FIG. 8 because a white pixel portion caused by blur or the like is converted into a chromatic color pixel by the noise removing.

After the noise removing is performed, the processor 21 performs determining of the white pixel for the image data subjected to the noise removing (ACT 23). The determining of the white pixel is processing of determining the white pixel existing in a region surrounded by a chromatic color pixel group (chromatic color region). The processor 21 extracts a contour (outermost) with respect to a chromatic color region in the image data subjected to the noise removing. For example, the processor 21 extracts the outermost contour line for the chromatic color pixel group to be connected. If the contour line with respect to the chromatic color region is extracted, the processor 21 calculates a ratio of the white pixels included in the contour for the chromatic color region. Here, the ratio of white pixels is a ratio of white pixels in all the pixels included in the contour. For example, the processor 21 calculates the ratio of white pixels based on the total number of pixels and the number of white pixels in the contour.

Figure 9:
FIG. 9 is a diagram illustrating an example of a contour line for a chromatic color region extracted by the image processing apparatus according to the embodiment.

FIG. 9 is a diagram illustrating a contour line r1 detected for the mark M1 designating a region according to a highlight made by a marker or a highlighter on the original document illustrated in FIG. 2. In the mark M1 indicating the highlighted region, the outermost side of the mark itself (chromatic color pixel group) is extracted as the contour line r1. The contour line r1 is a contour of a region highlighted by the marker. Accordingly, chromatic color pixels occupy the inside of the contour line r1 except for pixels such as noise.

Figure 10:
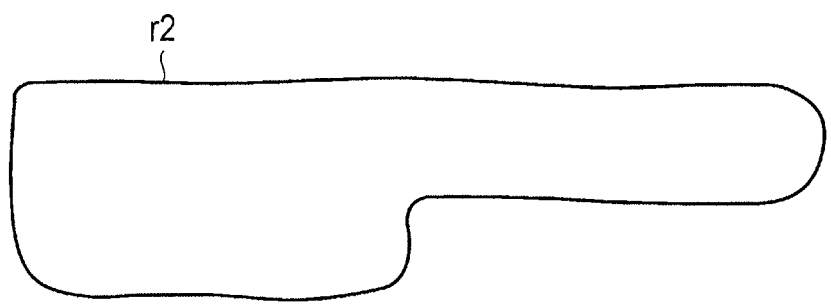
FIG. 10 is a diagram illustrating an example of a contour line for a chromatic color region extracted by the image processing apparatus according to an embodiment.
Figure 11:
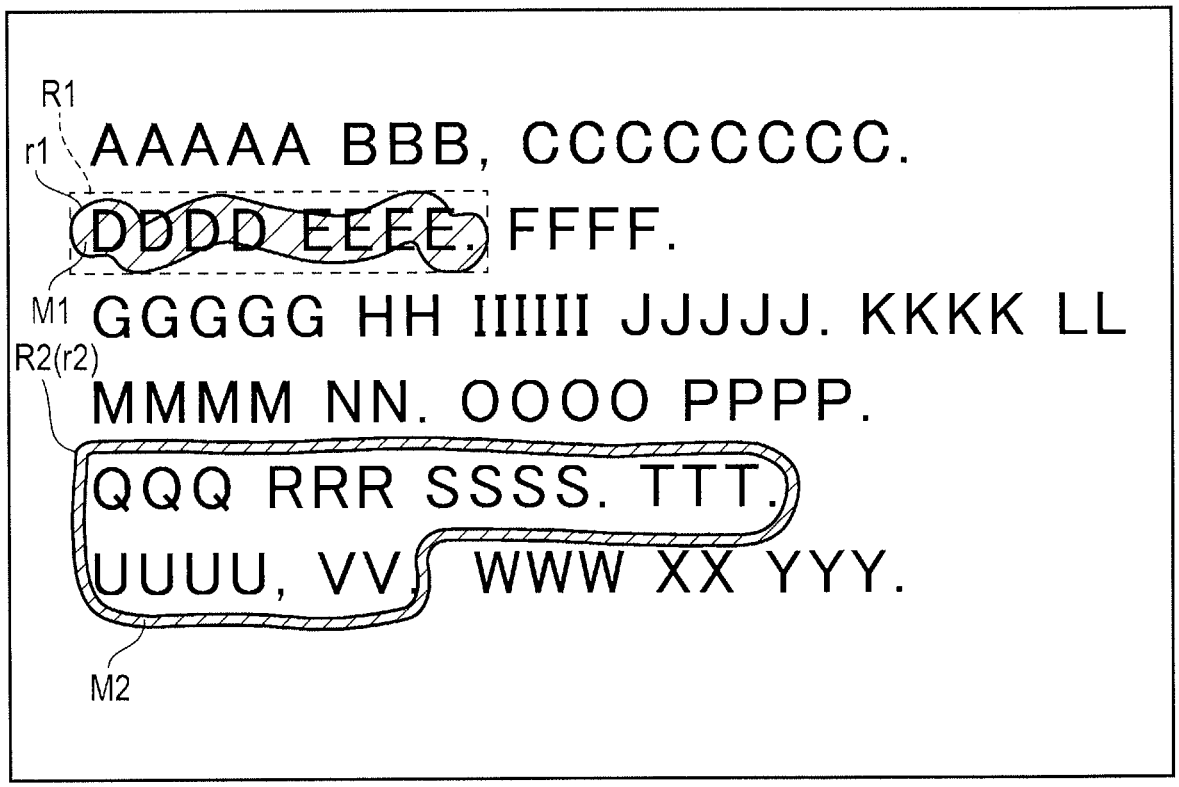
FIG. 11 is a diagram illustrating an example of a highlighted region and a circled region cut out by the image processing apparatus according to the embodiment as a result of region detecting.

FIG. 10 is a diagram illustrating a contour line r2 detected for the mark M2 that designates a region according to a box circled by a marker in the original document illustrated in FIG. 2. Since the mark M2 is formed so as to encircle a region to be designated, the outermost contour is extracted as the contour line r2. That is, the contour line r2 is a contour on an external side of the mark formed so as to encircle a region to be designated, and an internal side of the contour line r2 is not highlighted by the marker. Accordingly, many pixels (pixels of a background color in the original document) of colors different from the chromatic color exist on an internal side of the contour line r2. For example, if the background color of the original document is white, many white pixels exist inside the contour line r2. Here, the background color of the original document is assumed to be white, and the processor 21 performs determining of the white pixel for detecting white pixels as a background color of the original document.

If the determining of the white pixel is performed, the processor 21 performs determining of a marking method (ACT 24). In the determining of the marking method, the type of a marker region designated by the mark on the original document is determined. In the present embodiment, the processor 21 determines whether a region indicated by each mark detected from the read image of the original document is a highlighted region or a circled region, as the determining of the marking method.

In the determining of the white pixel described above, the processor 21 calculates a ratio of the white pixels (pixels of a color different from a chromatic color) existing inside contour lines of each marked region. There are few white pixels inside the contour line of the mark that designates a region with highlight, and there are many white pixels inside the contour line of the mark that designates a region with a circle. Accordingly, the processor 21 determines whether the region indicated by the mark is a highlighted region or a circled region, according to the ratio of the white pixels inside the contour line of the mark. This determination is selectively performed by using a threshold value as the circled region if the ratio exceeds the threshold value or as the highlighted region if the ratio is less than or equal to the threshold value.

For example, the processor 21 determines whether or not the ratio of the white pixels existing inside the contour line is larger than or equal to the threshold value. The processor 21 determines that the marking (marking method) of the contour line is the highlighted if the ratio of the white pixels existing inside the contour line is less than the threshold value. In addition, the processor 21 determines that the marking (marking method) of the contour line is a circle if the ratio of the white pixels existing inside the contour line is larger than or equal to the threshold value.

If the determining of the marking method ends, the processor 21 performs cutting out each marker region, based on the determination result of the marking method (ACT 25). Here, the processor 21 performs the cutting of the marker region according to the marking method. That is, the processor 21 performs the cutting of the highlighted region for the mark determined to be highlighted by the marking method. In addition, the processor 21 performs the cutting of the circled region for the mark determined to be a circle by the marking method.

For example, the processor 21 detects a rectangular (circumscribed rectangular) region including a chromatic color pixel group (chromatic color region) forming the mark, for the mark determined to be highlighted. The processor 21 specifies a coordinate value representing the rectangular region, based on the contour line of the mark illustrated in FIG. 9. The processor 21 cuts out the rectangular region according to the specified coordinate value and sets the cut rectangular region as the highlighted region. By cutting out the rectangular region that includes the chromatic color region (contour line of mark), a region also including a character that is not completely highlighted is cut out in the region specified by filling out.

In addition, the processor 21 detects a region (outermost region) based on the outermost contour of the mark, for the mark determined to be a circle. For example, the processor 21 cuts out a region along the contour line of the mark as illustrated in FIG. 10, and sets the cut region as the circled region.

In the above-described example, whether the mark is the highlighted region or the circled region is determined based on the ratio of the white pixels inside the contour line with respect to the chromatic color region, but whether the mark is the highlighted region or the circled region may be determined based on the ratio of chromatic color pixels inside the contour line. Here, the ratio of chromatic color pixels is a ratio of the chromatic color pixels in all the pixels included in the contour. For example, the processor calculates the ratio of chromatic color pixels based on the total number of pixels and the number of chromatic color pixels in the contour.

If the marking method is determined by the ratio of the chromatic color pixels in the contour, the processor determines the ratio of chromatic color pixels included in the contour for the chromatic color region, instead of the ratio of the white pixels, in ACT 23. If the ratio of the chromatic color pixels is determined, the processor determines that the chromatic color region is a mark indicating the highlighted region when the ratio of the chromatic color pixels is larger than or equal to the threshold value in the ACT 24, and determines that the chromatic color region is the mark indicating the circled region when the ratio of the chromatic color pixels is smaller than the threshold value. According to the processing, the processor can determine the marking method, according to the ratio of the chromatic color pixels inside the contour.

According to the above-described processing, the image processing apparatus detects a marker region from the read image of the original document, and classifies each detected marker region according to the marking method. The image processing apparatus according to the present embodiment determines whether the mark designates a region by highlight or designates a region by a circle. The image processing apparatus respectively cuts out the highlighted region and the circled region, based on the determination result of the marking method.

In addition, if it is determined that the mark designates a region by highlight, the image processing apparatus cuts out an image by setting the circumscribed rectangular region of the mark as a highlighted region. Thereby, the image processing apparatus can detect a region including a character or a character string designated by highlight even if there is a character which is not completely highlighted. As a result, the image processing apparatus can cut out the image of the highlighted region according to the intention of the user who marks the character or the character string by highlight.

In addition, if it is determined that the mark designates the circled region, the image processing apparatus cuts out the image by setting the outermost contour of a region indicated by the mark as the circled region. Thereby, the image processing apparatus can appropriately detect a region marked as a circle by a user and can cut out an image of the circled region according to the intention of the user.

Hereinafter, an application example of the classifying of a marker region performed by the image processing apparatus 1 according to the present embodiment will be described.

As described above, the image processing apparatus 1 according to the present embodiment detects regions (marker regions) on an original document designated by a user with highlight and a circle made by a marker, respectively. A highlighted region and a circled region may be set so as to perform different types of processing, or both regions may be target regions of the OCR processing. For example, even if both the highlighted region and the circled region are set as target regions for OCR processing, it is possible to classify the processing results for each region.

That is, the image processing apparatus 1 according to the present embodiment obtains a unique effect by being able to classify each region marked by two methods of highlighting and circling. For example, it is possible to perform different processing set for each of the highlighted region and the circled region. In addition, it is also possible to classify and manage each of the processing result for the highlighted region and the processing result for the circled region in association with each other.

Next, a first application example will be described.

An example in which number information and text information described in one slip, one form, and the like are marked by using highlight and a circle respectively will be described as a first application example.

Figure 12:
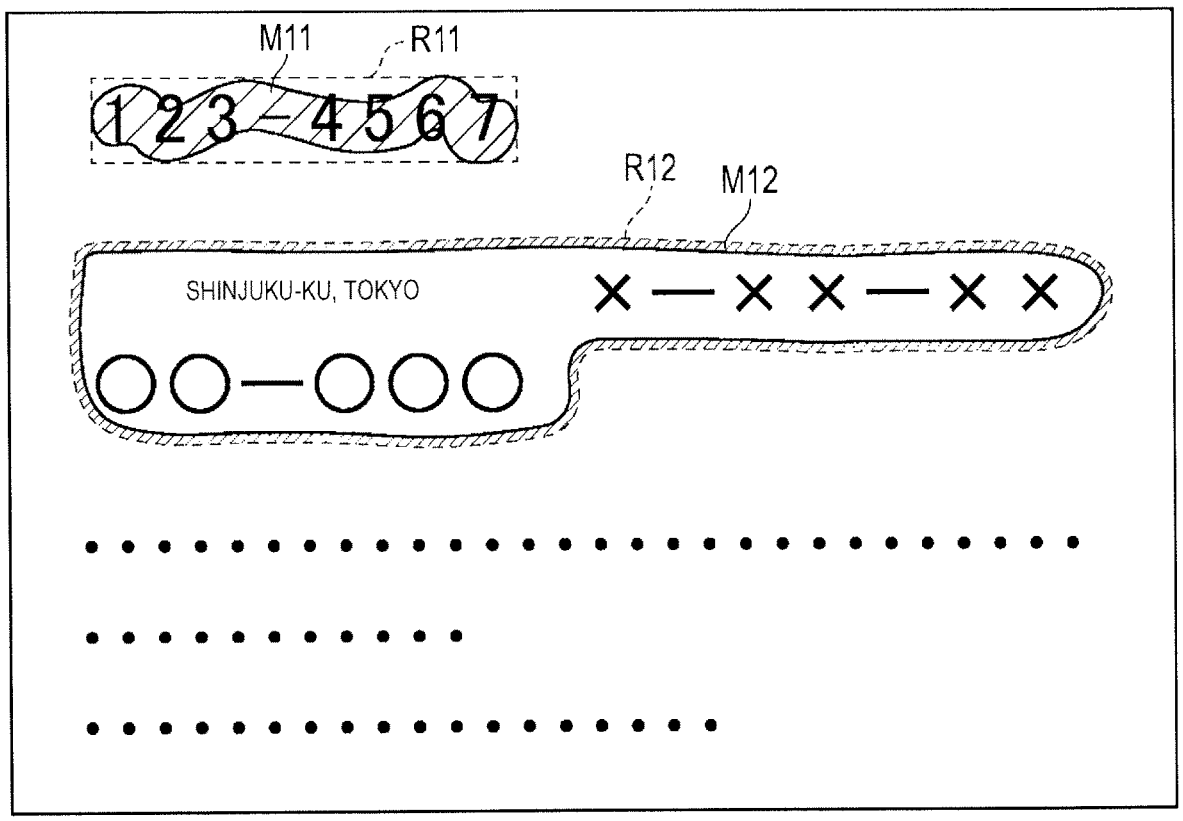
FIG. 12 is a diagram illustrating a first application example in which classifying of a marker region performed by the image processing apparatus according to the embodiment is applied.

FIG. 12 illustrates an example of an original document on which a zip code is with highlight and an address is marked with a circle for a slip and a form in which the zip code and the address are written. In the example illustrated in FIG. 12, two marks M11 and M12 and marker regions R11 and R12 corresponding to the marks are illustrated.

The mark M11 is an example in which a zip code is designated by highlight on the original document by using a marker. The marker region R11 indicates a region cut out as a highlighted region, based on the mark M11 determined to be highlighted. That is, the marker region R11 is a rectangular (circumscribed rectangle) region including a contour of the mark M11.

The mark M12 is an example in which a region where an address is described is designated by a circle on an original document, using the marker. The marker region R12 is a region cut out as a circled region, based on the mark M12 determined to be a circle. That is, the marker region R12 is a region formed by a contour (outermost) on the outermost side of the mark M12.

As illustrated in FIG. 12, by classifying a zip code and an address marked by different methods, it is possible to perform processing suitable for each piece of information. In the example illustrated in FIG. 12, it is possible to perform OCR processing suitable for recognizing a zip code in the highlighted region and to perform OCR processing suitable for recognizing an address in the circled region. In addition, the recognition result of the zip code in the highlighted region and the recognition result of the address in the circled region can be incorporated into a database and a workflow in a state where each is linked.

Next, a second application example will be described.

An example in which a mark made by a circle is further added to an original document marked with highlight and a circle will be described as a second application example.

Figure 13:
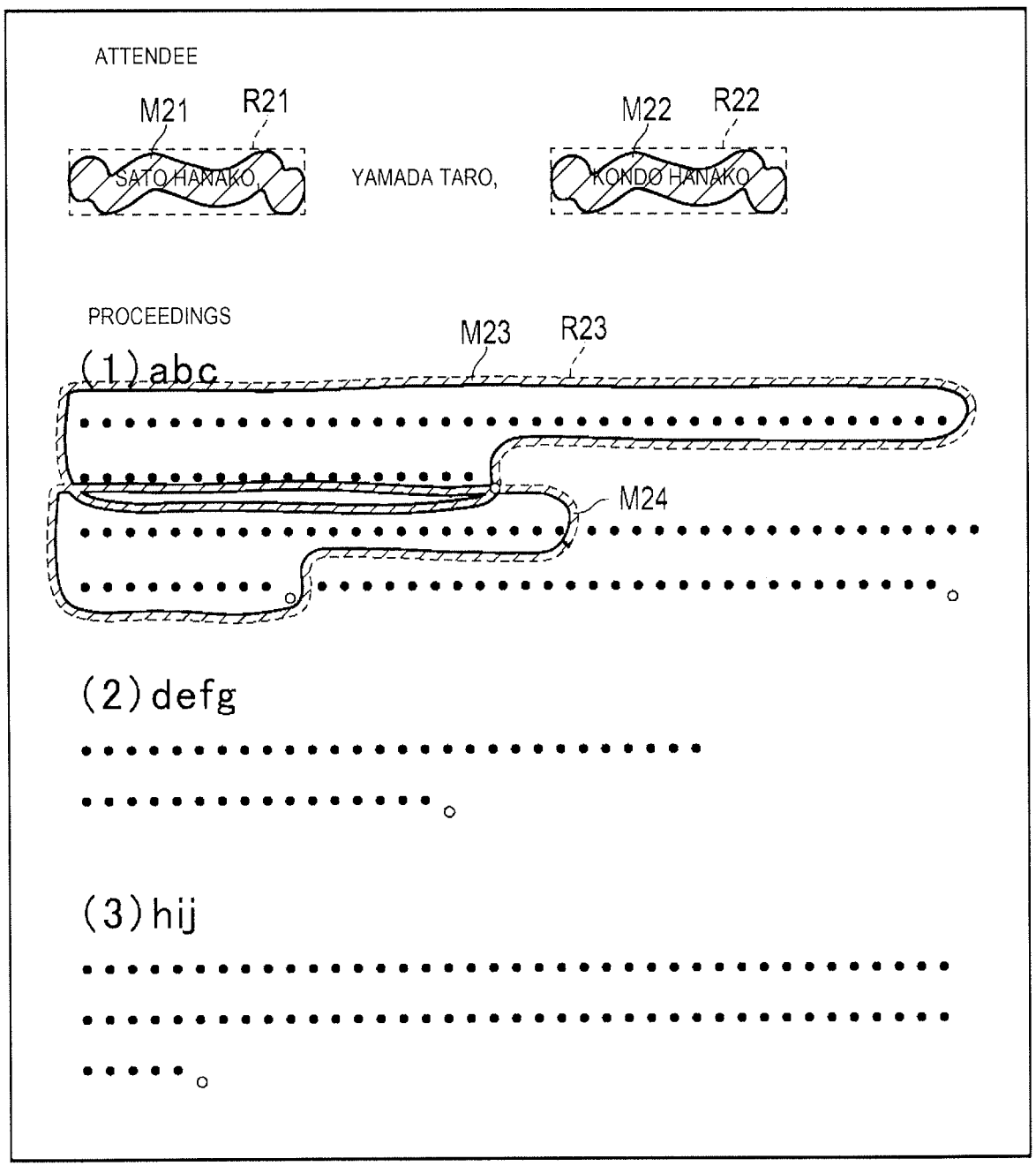
FIG. 13 is a diagram illustrating a second application example in which classifying of a marker region performed by the image processing apparatus according to the embodiment is applied.

FIG. 13 illustrates an example in which attendees are marked with highlight and main parts (necessary parts) of proceedings are marked with circles with respect to an original document (minutes) in which attendees and proceedings are described. In the example illustrated in FIG. 13, four marks M21, M22, M23, and M24 and marker regions R21, R22, R23, and R24 corresponding to the marks are illustrated.

The respective marks M21 and M22 are examples in which attendees are designated and highlighted by using a marker. The marker regions R21 and R22 indicate regions cut out as highlighted regions based on the marks M21 and M22 determined to be highlighted. That is, the marker regions R21 and R22 are rectangular (circumscribed rectangle) regions including contours of the marks M21 and M22.

The mark M23 is an example in which a part of the proceedings on the original document is circled and designated by using a marker. In addition, the mark M24 is an example in which a part of the proceeding different from the mark M23 is circled and designated by using a marker. For example, since the mark M23 is written and thereafter another part is designated, the mark M24 is additionally written.

In the example illustrated in FIG. 13, the marks M23 and M24 are written in a connected state. Accordingly, the marker region R23 is detected as a component in which the marks M23 and M24 are connected to each other by a chromatic color. The component in which the marks M23 and M24 are connected to each other is determined to be a circle because there are many white pixels inside a contour line. Accordingly, the marker region R23 is cut out as a circled region, based on the marks M23 and M24 determined to be a circle. That is, the marker region R23 becomes a region formed by the outermost contour (outermost) of a region where the marks M23 and M24 to be connected are formed.

The image processing apparatus according to the embodiment can perform processing for a circled region cut out as the outermost of the connected chromatic color region separately from highlight. Accordingly, as in the second application example described above, the image processing apparatus 1 can cut out a region added and designated by a mark of a circle together with a region previously designated by a circle. As a result, the image processing apparatus 1 according to the embodiment can perform processing by including information such as notes added to the original document.

The image processing apparatus according to the embodiment selectively determines whether a mark is the circled region or the highlighted region according to whether or not the ratio of the white pixels occupying all the pixels in a region cut out as the outermost contour exceeds the threshold value, even if there are a plurality of highlighted regions or circled regions in the same page. Accordingly, the image processing apparatus according to the present embodiment can reliably determine which region the mark is, even if the circled region and the highlighted region coexist in one page. In addition, the present embodiment also has a merit that it is easy to visually distinguish between the highlighted region of a character and the circled region of a character. It is preferable that the highlighted region and the circled region exist in the same page such that one does not include the other.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
a scanner configured to acquire a read image of an original document;
a memory configured to store the read image of the original document that is acquired by the scanner; and
a processor configured to detect a painted region including a region that is painted with a chromatic color in the read image of the original document which is stored in the memory and a circled region including a region circled by the chromatic color, and configured to classify the painted region as a region for first processing and classify the circled region as a region for second processing, wherein the processor cuts out a rectangular region including the region that is painted with the chromatic color as a painted region, the processor cuts out a contour of a chromatic color region that is formed so as to circle a partial region on the original document as a circled region, and the processor performs the first processing for the region that is cut out as the painted region and performs the second processing for the region that is cut out as the circled region.

2. An image processing apparatus comprising:

a scanner configured to acquire a read image of an original document;

a memory configured to store the read image of the original document that is acquired by the scanner; and a processor configured to detect a painted region including a region that is painted with a chromatic color in the read image of the original document which is stored in the memory and a circled region including a region circled by the chromatic color, and configured to classify the painted region as a region for first processing and classify the circled region as a region for second processing, wherein the processor extracts a contour line of the chromatic color region in the read image of the original document, determines that the chromatic color region is a mark indicating the painted region if a ratio of white pixels in the contour line is less than a threshold value, and determines that the chromatic color region is a mark indicating the circled region if the ratio of the white pixels in the contour line is larger than or equal to the threshold value.

3. An image processing apparatus comprising:

a scanner configured to acquire a read image of an original document;

a memory configured to store the read image of the original document that is acquired by the scanner; and a processor configured to detect a painted region including a region that is painted with a chromatic color in the read image of the original document which is stored in the memory and a circled region including a region circled by the chromatic color, and configured to classify the painted region as a region for first processing and classify the circled region as a region for second processing, wherein the processor extracts a contour line of the chromatic color region in a read image of the original document, determines that the chromatic color region is a mark indicating the painted region if a ratio of chromatic color pixels in the contour line is larger than or equal to a threshold value, and determines that the chromatic color region is a mark indicating the circled region if the ratio of the chromatic color pixels in the contour line is less than the threshold value.

4. A method for differentiating marked-up information in an image, the method comprising:

receiving an input from a user;

acquiring, in an optical acquisition device, an image;

communicating the acquired image to a data processor;

identifying, in the data processor, one or more marked-up regions distinct from other portions of the acquired image, wherein identifying the one or more marked-up regions includes first processing one or more regions highlighted with a chromatic color and then processing one or more regions surrounded by a contour line of the chromatic color;

differentiating the one or more marked-up regions in response to the input by the user; and outputting a modified image based on the image and the differentiated one or more marked-up regions, wherein the one or more marked-up regions include one or more regions highlighted with a chromatic color, or surrounded by a contour line of the chromatic color contrasting against other portions of the image, or both.

5. The method of claim 4, further comprising saving the acquired image into a memory device.

6. The method of claim 4, wherein the one or more marked-up regions include a region highlighted with a chromatic color contrasting against other portions of the image.

7. The method of claim 4, wherein the one or more marked-up regions include a region surrounded by a chromatic color contrasting against other portions of the image.

8. The method of claim 4, wherein identifying the one or more marked-up regions comprises:

extracting a contour line of a chromatic color region in the image, identifying the one or more regions highlighted with the chromatic color when, in the one or more highlighted regions, a chromatic color pixels to white pixels ratio in the contour line is greater than or equal to a threshold value; and identifying the one or more regions surrounded by the contour line when, in the chromatic color region, a white pixels to chromatic color pixels ratio bounded within the contour line is greater than or equal to the threshold value.

9. A method for differentiating marked-up information in an image, the method comprising:

receiving an input from a user;

acquiring, in an optical acquisition device, an image;

communicating the acquired image to a data processor;

identifying, in the data processor, one or more marked-up regions distinct from other portions of the acquired image;

differentiating the one or more marked-up regions in response to the input by the user; and outputting a modified image based on the image and the differentiated one or more marked-up regions, wherein differentiating the one or more marked-up regions in response to the input by the user comprises removing or emphasizing the one or more marked-up regions.

10. A method for differentiating marked-up information in an image, the method comprising:

receiving an input from a user;

acquiring, in an optical acquisition device, an image;

communicating the acquired image to a data processor;

identifying, in the data processor, one or more marked-up regions distinct from other portions of the acquired image;

differentiating the one or more marked-up regions in response to the input by the user; and outputting a modified image based on the image and the differentiated one or more marked-up regions, wherein identifying the one or more marked-up regions comprises:

extracting a contour line of a chromatic color region in the image;

determining that the chromatic color region is a mark indicating a highlighted region if a ratio of chromatic color pixels in the contour line is larger than or equal to a threshold value; and determining that the chromatic color region is a mark indicating the circled region if the ratio of the chromatic color pixels in the contour line is less than the threshold value.

11. An image processing apparatus comprising:

a control unit receiving an input from a user;

a scanner operable to acquire an image according to the input;

a memory unit operable to store the image; and a processor operable to:
  process the stored image according to the input, wherein the operation comprises determining a chromatic color and identifying a marker region of the chromatic color, wherein identifying the marker region includes first processing one or more regions highlighted with the chromatic color and then processing one or more regions surrounded by a contour line of the chromatic color; and
  output a modified image based on the image and the marker region, wherein the marker region includes one or more regions highlighted with the chromatic color, surrounded by a contour line of the chromatic color contrasting against other portions of the image, or both.

12. The image processing apparatus of claim 11, wherein the operation performed by the processor further comprises removing noises of the image, determining white pixels of the image, and determining a marking method associated with the chromatic color.

13. The image processing apparatus of claim 12, wherein the marking method associated with the chromatic color associates with at least one parameter set in the input received from the user.

14. The image processing apparatus of claim 12, wherein the operation further includes, subsequent to identifying the marker region, cutting the marker region from the image and storing an edited image into the memory unit.

15. The image processing apparatus of claim 11, wherein the operation by the processor further comprises identifying a highlighted region indicated by an area covered by the chromatic color, or a circled region indicated by an area surrounded by a contour line of the chromatic color, or both.

* * * * *